May 16, 1961
L. TALALAY ET AL
2,984,631
METHOD FOR MAKING LATEX FOAM RUBBER
Filed May 11, 1959
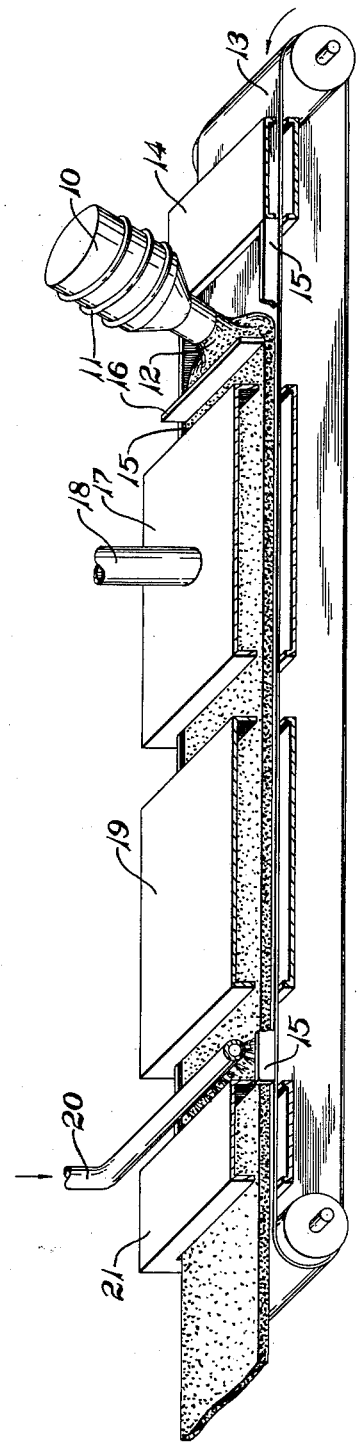
INVENTORS
LEON TALALAY
BY GEORGE F. WATERS
James R. Lindsay
ATTY.

United States Patent Office 2,984,631
Patented May 16, 1961

2,984,631
METHOD FOR MAKING LATEX FOAM RUBBER

Leon Talalay, New Haven, and George F. Waters, Shelton, Conn., assignors, by mesne assignments, of one-half to The B. F. Goodrich Company, New York, N.Y., a corporation of New York, and one-half to Dayco Corporation, a corporation of Ohio Filed May 11, 1959, Ser. No. 812,552
8 Claims. (Cl. 260—2.5)

This invention relates to a process for making latex foam rubber and pertains more particularly to a process for making latex foam rubber wherein diluted coagulating acid gases are used for gelling the latex foam. This application is a continuation-in-part application of my copending application Serial No. 514,044, filed June 8, 1955, now abandoned.

In the manufacture of latex foam rubber, gelation of the frothed latex has been accomplished in a variety of ways. One process which has been suggested for gelling the latex foam involves diffusing pure carbon dioxide gas at room temperature through the froth. This process for congealing latex foam, however, has certain disadvantages which have deterred its widespread use by the industry. For one thing, the use of pure carbon dioxide gas as a coagulating substance is rather expensive.

It now has been found that diluted coagulating acid gas can be used for gelling a latex foam if the diluted coagulating acid gas is chilled before being introduced into the foam. In accordance with this invention, the latex foam is gelled by diffusing the chilled diluted coagulating gas through the latex foam at substantially atmospheric pressure while the latex is in a fluid (unfrozen) condition. The diluted coagulating acid gas is introduced into the latex foam at a temperature below 10° C., preferably at a temperature from —10° C. to —20° C., but should not be introduced into the latex foam at a temperature so low that the diluted coagulating acid gas causes the latex foam to freeze. Also, the dilute coagulating acid gas preferably is not introduced into the latex foam at a pressure above about .03 pound per square inch gauge, since a pressure much above .03 pound per square inch gauge will tend to distort the cellular structure of the foam. (The term "diffusing" used herein is intended to include not only the transfer of the gaseous coagulating fluid through a gaseous medium but also to include the transfer of the gaseous coagulating fluid through a liquid medium by absorption or dissolution of the gaseous coagulating fluid in the liquid.)

It also has been found that, although it is not necessary, it is preferable that the temperature of the latex be lowered to a temperature of 10° C. or below before the diluted coagulating acid gas is introduced into the latex foam. However, the temperature of the latex should not be lowered to a temperature that will cause the latex to freeze. A lowering of the latex temperature to between 0° C. and 10° C. is preferred.

The process of this invention is particularly useful for making latex foam rubber sheet or slab either by a continuous process or a batch process, as hereinafter described.

Any acid-coagulable latex, or a blend of such latices, may be formed into a latex foam rubber by use of the process of this invention. Among the acid-coagulable latices are natural rubber latices which are aqueous dispersions of essentially a rubbery polymer of isoprene, such as caoutchouc and the like, and synthetic latices, such as aqueous dispersions of rubbery polymers of open-chain conjugated diolefins having from four to eight carbon atoms exemplified by butadiene-1,3; 1,4-dimethyl butadiene-1,3; 2,3-dimethyl butadiene-1,3 and the like, or rubbery copolymers of these and similar conjugated diolefins with each other or with copolymerizable monomeric materials containing a single ethylenic linkage, such as styrene, methyl acrylate, ethyl acrylate, methyl methacrylate, ethyl methacrylate, acrylonitrile, isobutylene, or similar materials, or the rubbery polymers of chloroprene, and the like.

In utilizing the process of this invention, the latex is compounded in the usual manner with vulcanizing agents, anti-oxidants, zinc oxide, fillers, and other compounding ingredients usually added to the latex for imparting desired properties to the latex foam rubber. The latex should be stabilized with an ionic soap stabilizer, such as potassium oleate, and should contain sufficient ammonia so that the compounded latex has a pH of at least 8.5, a pH of 9 or above being preferred. The compounded latex then is frothed, for example by mechanically entraining an non-coagulating gas, such as air or an inert gas, in the latex or by releasing a non-coagulating gas, such as oxygen or nitrogen, in the latex by causing the decomposition of a gas liberating material dispersed in the latex or by causing a gas liberating material to chemically react with a material in the latex with the liberation of a non-coagulating gas as a reaction product, and the frothed latex is shaped to the desired configuration by any of the well-known procedures. The shaped froth then is congealed, in accordance with this invention, by diffusing diluted coagulating acid gas chilled to a temperature below 10° C. through the latex foam at substantially atmospheric pressure. The term "coagulating acid gas" is used herein to define gaseous carbon dioxide, sulfur dioxide, hydrogen chloride, hydrogen sulfide and acid forming nitrogen oxides. The coagulating acid gas is diluted with a non-coagulating gaseous material such as air or an inert gas. The diluted coagulating acid gas used for gelling the latex foam may consist of a mixture of coagulating acid gases diluted with one or more non-coagulating gaseous materials. The diluted coagulating acid gas may contain as little as 10 percent by volume of coagulating acid gas, but preferably contains at least 25 percent by volume of coagulating acid gas. Chilled diluted coagulating acid gases containing from 10 to 70 percent by volume of coagulating acid gas have been used for gelling the latex foam.

The length of time during which the gaseous coagulating fluid must be diffused into the latex foam to cause complete gelation of the latex varies depending mainly upon the concentration of coagulating acid gas in the gaseous coagulating fluid, upon the temperatures of the latex and of the gaseous coagulating fluid, and upon the thickness of the cellular latex mass through which the gaseous coagulating fluid must diffuse. A gaseous coagulating fluid having a coagulating acid gas concentration of about 35 percent by volume will diffuse into and irreversibly gel a froth two and one-half inches thick within six to eight minutes. The relationship between gelation time and thickness of froth for a latex gelled with a particular gaseous coagulating fluid within the purview of this invention is essentially a straight line function up to a froth thickness of six inches when gelatin time is plotted on a logarithmic scale and the thickness of the froth is plotted on a linear scale. Preferably, the thickness of frothed latex through which the gaseous coagulating fluid must diffuse should not exceed about six inches, since if the thickness of frothed latex through which the gaseous coagulating fluid must diffuse exceeds about six inches, the length of time required for the gaseous coagulating fluid to penetrate completely through the thickness of frothed latex will be so great that excessive breakdown of the latex foam may occur in the froth farthest from the source of entry of the gaseous coagulating fluid into the froth.

If the gaseous coagulating fluid used to gel the latex foam contains an appreciable amount of a strong-acid forming coagulating acid gas, the congealed latex foam may be so acidic that difficulty will be experienced in vulcanizing it. If the gelled foam is too acidic to accomplish satisfactory vulcanization of the latex, the gelled foam should be realkalized, for example by exposing the gelled foam to an atmosphere of ammonia, to bring the pH of the foam up to at least a pH of 6 before vulcanization of the gelled foam is attempted.

The gelled latex foam can be vulcanized in the usual ways, such as vulcanizing the gelled latex foam in an atmosphere of steam or hot air. After vulcanization of the latex foam, the resulting latex foam rubber normally is washed to remove water soluble materials from the latex foam rubber, and then is dried.

The process of this invention is shown by the following illustration. However, it will be understood that it is not intended to limit this invention to this illustration.

The single figure of the drawing shows schematically the making of a continuous sheet of latex foam rubber using the process of this invention.

A compounded latex is frothed by mechanically entraining air into the latex is a conventional continuous foamer apparatus 10. The foamer 10 is provided with a suitable cooling system 11 for chilling the latex to a temperature of 10° C. or below but above the freezing temperature of the compounded latex. The chilled latex foam 12 is discharged from the foamer 10 onto a conveyor belt 13 which has been chilled, if necesary, to room temperature or desirably a temperature substantially below room temperature, a temperature the same as the temperature of the chilled latex foam being preferred, by advancing the conveyor belt 13 through a suitable refrigeration chamber 14. The width of the sheet of latex foam rubber produced is determined by the spacing between side guide ledges 15, 15 disposed along the conveyor belt 13, and the thickness of the sheet of latex foam rubber produced is controlled by doctor blade 16 (both operations for shaping latex foam into a desired sheet being well known).

The frothed latex in sheet form then is advanced through a coagulating chamber 17 which contains an atmosphere of diluted coagulating acid gas, the diluted coagulating gas being at substantially atmospheric pressure and chilled to a temperature below 10° C. Chamber 17 is provided with suitable means, such as pipe 18, for charging chilled coagulating gas into chamber 17. The latex foam is irreversibly gelled throughout the entire thickness of the sheet when it emerges from chamber 17.

The gelled latex foam then is advanced into a vulcanizing chamber 19 in which the latex foam is vulcanized by steam or hot air. After the latex foam is vulcanized, the latex foam rubber sheet is washed with warm water by advancing the sheet of latex foam rubber under a sprinkling device 20, and finally is dried in drying chamber 21.

Instead of making a continuous sheet of latex foam rubber, as described above, sheets or slabs of any desired length can be made by placing transverse dividing ledges between the side guide ledges, the transverse dividing ledges being spaced from one another a distance equal to the length of the slabs of latex foam rubber desired to be made, or the conveyor may be equipped with flat pans of the desired slab dimensions.

The process of this invention is further illustrated by the following typical examples.

Example I

A natural rubber latex is compounded in accordance with the following recipe:

| Material | Parts by Weight | |
|---|---|---|
| | Dry | Wet |
| Natural latex (60% solids) | 100.00 | 166.67 |
| Potassium oleate (20% aqueous solution) | 1.50 | 7.50 |
| Ammonia (25% aqueous solution) | 2.00 | 8.00 |
| Zinc oxide (50% aqueous dispersion) | 3.00 | 6.00 |
| Sulfur (50% aqueous dispersion) | 2.00 | 4.00 |
| Zinc diethyl dithiocarbamate (50% aqueous dispersion) | 1.25 | 2.50 |
| Zinc mercaptobenzothiazole (50% aqueous dispersion) | 1.25 | 2.50 |
| Sym. di-beta naphthyl p-phenylenediamine (50% aqueous dispersion) | 1.50 | 3.00 |
| | 112.50 | 200.17 |

The compounded latex is chilled to a temperature of 10° C. and is frothed mechanically to produce a foamed latex mix having a wet foam density of about 0.15 gram per cubic centimeter. The froth is shaped into a sheet three inches thick and is congealed by exposing the shaped froth to an atmosphere of a gaseous coagulating fluid consisting of a mixture of 10 percent by volume of carbon dioxide and 90 percent by volume of air, the gaseous coagulating fluid being at substantially atmospheric pressure and at a temperature of −10° C., for a period of 15 minutes. The coagulated froth is vulcanized in steam at 100° C. for 25 minutes, and the vulcanizate is washed and then dried.

The resulting latex foam rubber has excellent physical properties including high tensile strength and a fine cellular structure of uniform cell size, and is free of internal fissures.

Example II

A natural rubber latex is compounded in accordance with the recipe recited in Example I and is frothed mechanically to produce a latex foam. The latex foam is shaped into a sheet 2½ inches thick and is gelled by exposing the shaped foam at room temperature to an atmosphere consisting of 30 percent by volume of carbon dioxide and 70 percent by volume of air, the gaseous mixture being at substantially atmospheric pressure and chilled to a temperature of −20° C., for a period of 25 minutes. The congealed froth is vulcanized in steam at 125° C. for 25 minutes, and the vulcanizate is washed and dried.

The latex foam rubber has excellent physical properties and cellular texture.

Example III

A butadiene-styrene latex (GR–S latex) is compounded in accordance with the following recipe:

| Material | Parts by Weight | |
|---|---|---|
| | Dry | Wet |
| GR–S latex (57.5% solids) | 100.00 | 174.00 |
| Ammonium ricinoleate (35% aqueous solution) | 2.00 | 5.72 |
| Ammonia (25% aqueous solution) | 1.00 | 4.00 |
| Glycine (20% solution) | 1.00 | 5.00 |
| Zinc oxide (50% aqueous dispersion) | 3.00 | 6.00 |
| Sulfur (50% aqueous dispersion) | 2.00 | 4.00 |
| Zinc diethyl dithiocarbamate (50% aqueous dispersion) | 1.25 | 2.50 |
| Zinc mercaptobenzothiazole (50% aqueous dispersion) | 1.25 | 2.50 |
| Sym. di-beta naphthyl p-phenylenediamine (50% aqueous dispersion) | 1.50 | 3.00 |
| | 113.00 | 206.72 |

The compounded latex is frothed in a mechanical foamer and is chilled to a temperature of 0° C. during the frothing operation. The chilled latex is shaped to a desired configuration. Gelation of the frothed latex is effected by exposing the frothed latex to an atmosphere consisting of a gaseous mixture of 35 percent by volume of sulfur dioxide and 65 percent by volume of air, the mixture being chilled to a temperature of 10° C. and at substantially atmospheric pressure, for a period of 15 minutes.

The gelled froth is exposed to an atmosphere consisting of a gaseous mixture of 20 percent by volume of ammonia and 80 percent by volume of air at a temperature of 0° to 10° C. for a period of 20 minutes to raise the pH of the gelled froth at least to a pH of 6. The coagulated froth then is vulcanized in air at 100° C. for 40 minutes, and the vulcanizate is washed and then dried. The latex foam rubber so produced has excellent physical properties and cellular texture.

*Example IV*

A blend of natural rubber latex and a butadiene-styrene latex is compounded in accordance with the following recipe:

| Material | Parts by Weight | |
|---|---|---|
| | Dry | Wet |
| Natural latex (60% solids) | 60.00 | 100.00 |
| GR-S latex (57.5% solids) | 40.00 | 69.60 |
| Ammonium ricinoleate (35% aqueous solution) | 1.50 | 4.28 |
| Ammonia (25% aqueous solution) | .50 | 2.00 |
| Glycine (20% aqueous solution) | 1.00 | 5.00 |
| Styrenated phenol (50% emulsion) | 1.50 | 3.00 |
| Zinc oxide (50% aqueous dispersion) | 3.00 | 6.00 |
| Sulfur (50% aqueous dispersion) | 2.00 | 4.00 |
| Zinc diethyl dithiocarbamate (50% aqueous dispersion) | 1.25 | 2.50 |
| Zinc mercaptobenzothiazole (50% aqueous dispersion) | 1.25 | 2.50 |
| | 112.00 | 198.88 |

The compounded latex is frothed in a mechanical foamer and then is chilled to a temperature of 5° C. The chilled froth is formed into a sheet six inches thick and the latex is gelled by exposing the shaped froth to an atmosphere consisting of a gaseous mixture of 40 percent by volume of carbon dioxide and 60 percent by volume of nitrogen, the gaseous mixture being at substantially atmospheric pressure and chilled to a temperature of −20° C., for a period of 30 minutes. The congealed froth is vulcanized in steam at 100° C. for 35 minutes, and the vulcanizate is washed and then dried.

The latex foam rubber has excellent physical properties and cellular texture.

*Example V*

A neoprene latex (an aqueous dispersion of a rubbery polymer of chloroprene) is compounded in accordance with the following recipe:

| Material | Parts by Weight | |
|---|---|---|
| | Dry | Wet |
| Neoprene latex (58% solids) | 100.00 | 172.50 |
| Ammonium ricinoleate (35% aqueous solution) | 1.50 | 4.28 |
| Ammonia (25% aqueous solution) | 1.00 | 4.00 |
| Glycine (20% aqueous solution) | 1.00 | 5.00 |
| Sulfur (50% aqueous dispersion) | 2.00 | 4.00 |
| Zinc oxide (50% aqueous dispersion) | 3.00 | 6.00 |
| Sym. di-beta naphthyl p-phenylenediamine (50% aqueous dispersion) | 2.50 | 3.00 |
| Sym. diphenylthiourea (50% aqueous dispersion) | 1.00 | 2.00 |
| Sodium dibutyl dithiocarbamate (50% aqueous dispersion) | 1.00 | 2.00 |
| | 112.00 | 202.78 |

The compounded latex is frothed in a mechanical foamer and is chilled during the frothing operation to a temperature of 10° C. The chilled latex froth is shaped to a desired contour and gelled by exposing the shaped froth to a gaseous mixture of 60 percent by volume of air and 40 percent by volume of carbon dioxide, the gaseous mixture being chilled to a temperature of −10° C. and at substantially atmospheric pressure, for a period of 20 minutes. The gelled froth is vulcanized in a pressurized steam chamber with steam at 125° C. for 40 minutes, and the vulcanizate is washed and then dried. The latex foam rubber has excellent physical properties and cellular texture.

*Example VI*

A blend of natural rubber latex and a butadiene-styrene latex (GR-S latex) is compounded in accordance with the following recipe:

| Material | Parts by Weight | |
|---|---|---|
| | Dry | Wet |
| Natural latex (60% solids) | 50.00 | 83.40 |
| GR-S latex (57.5% solids) | 50.00 | 87.00 |
| Ammonium ricinoleate (35% aqueous solution) | 1.50 | 4.28 |
| Ammonia (25% aqueous solution) | .50 | 2.00 |
| Glycine (20% aqueous solution) | 1.00 | 5.00 |
| Styrenated phenol (50% emulsion) | 1.50 | 3.00 |
| Zinc oxide (50% aqueous dispersion) | 3.00 | 6.00 |
| Sulfur (50% aqueous dispersion) | 2.00 | 4.00 |
| Zinc diethyl dithiocarbamate (50% aqueous dispersion) | 1.25 | 2.50 |
| Zinc mercaptobenzothiazole (50% aqueous dispersion) | 1.25 | 2.50 |
| | 112.00 | 199.68 |

The compounded latex is frothed in a mechanical foamer and the resulting latex foam is formed into a sheet three inches thick. The latex foam is gelled by exposing the shaped foam at room temperature to an atmosphere consisting of 70 percent by volume of carbon dioxide and 30 percent by volume of air, the gaseous mixture being at substantially atmospheric pressure and chilled to a temperature of −15° C., for a period of 15 minutes. The congealed froth is vulcanized in steam at 125° C. for 25 minutes, and the vulcanizate is washed and dried.

The latex foam rubber has excellent physical properties and cellular texture.

*Example VII*

A natural rubber latex is compounded in accordance with the following recipe:

| Material | Parts by Weight | |
|---|---|---|
| | Dry | Wet |
| Natural latex (60% solids) | 100.00 | 166.67 |
| Potassium oleate (20% aqueous solution) | 1.50 | 7.50 |
| Ammonia (25% aqueous solution) | 2.00 | 8.00 |
| Zinc oxide (50% aqueous dispersion) | 3.00 | 6.00 |
| Sulfur (50% aqueous dispersion) | 2.00 | 4.00 |
| Zinc diethyl dithiocarbamate (50% aqueous dispersion) | 1.25 | 2.50 |
| Zinc mercaptobenzothiazole (50% aqueous dispersion) | 1.25 | 2.50 |
| Sym. di-beta naphthyl p-phenylenediamine (50% aqueous dispersion) | 1.50 | 3.00 |
| | 112.50 | 200.17 |

The compounded latex is frothed mechanically and the resulting latex foam is formed into a sheet three inches thick. The latex foam is gelled by exposing the shaped foam at room temperature to an atmosphere consisting of 55 percent by volume of carbon dioxide and 45 percent by volume of air, the gaseous mixture being at substantially atmospheric pressure and chilled to a temperature of −10° C., for a period of 25 minutes. The congealed froth is vulcanized at 100° C. for 30 minutes, and the vulcanizate is washed and dried.

The latex foam rubber has excellent physical properties and cellular texture.

Latex foam rubber made by the process of this invention may be used in any application where latex foam rubber is desirable, for example for pillows, mattresses or furniture cushioning.

It is clear that many modifications and variations of this invention may be made without departing from the

We claim:

1. A method for making latex foam rubber from an acid-coagulable latex which comprises frothing said acid-coagulable latex into a fluid latex foam, coagulating said fluid latex foam by diffusing a gaseous mixture containing from 10 to 70 percent by volume of coagulating acid gas, the balance of said gaseous mixture being non-coagulating gas, through said fluid latex foam at substantially atmospheric pressure, said gaseous mixture being at a temperature below 10° C. and above a temperature sufficiently low to freeze said fluid latex foam, and vulcanizing the coagulated latex foam.

2. A method for making latex foam rubber from an acid-coagulable latex which comprises frothing said acid-coagulable latex into a fluid latex foam, coagulating said fluid latex foam by diffusing a gaseous mixture containing from 10 to 70 percent by volume of carbon dioxide gas, the balance of said gaseous mixture being non-coagulating gas, through said fluid latex foam at substantially atmospheric pressure, said gaseous mixture being at a temperature below 10° C. and above a temperature sufficiently low to freeze said fluid latex foam, and vulcanizing the coagulated latex foam.

3. A method for making latex foam rubber from an acid-coagulable latex which comprises frothing said acid-coagulable latex into a fluid latex foam, coagulating said fluid latex foam by diffusing a gaseous mixture containing from 10 to 70 percent by volume of carbon dioxide gas, the balance of said gaseous mixture being air, through said fluid latex foam at substantially atmospheric pressure, said gaseous mixture being at a temperature below 10° C. and above a temperature sufficiently low to freeze said fluid latex foam, and vulcanizing the coagulated latex foam.

4. A method for making latex foam rubber from an acid-coagulable latex which comprises frothing said acid-coagulable latex into a fluid latex foam, coagulating said fluid latex foam by diffusing a gaseous mixture containing from 10 to 70 percent by volume of carbon dioxide gas, the balance of said gaseous mixture being nitrogen, through said fluid latex foam at substantially atmospheric pressure, said gaseous mixture being at a temperature below 10° C. and above a temperature sufficiently low to freeze said fluid latex foam, and vulcanizing the coagulated latex foam.

5. A method for making latex foam rubber from an acid-coagulable latex which comprises frothing said acid-coagulable latex into a fluid latex foam, coagulating said fluid latex foam by diffusing a gaseous mixture containing from 25 to 70 percent by volume of coagulating acid gas, the balance of said gaseous mixture being non-coagulating gas, through said fluid latex foam at substantially atmospheric pressure, said gaseous mixture being at a temperature below 10° C. and above a temperature sufficiently low to freeze said fluid latex foam, and vulcanizing the coagulated latex foam.

6. A method for making latex foam rubber from an acid-coagulable latex which comprises frothing and chilling said acid-coagulable latex to form a fluid latex foam chilled to a temperature below 10° C. and above the freezing point of said latex foam, coagulating said fluid latex foam by diffusing a gaseous mixture containing from 10 to 70 percent by volume of coagulating acid gas, the balance of said gaseous mixture being non-coagulating gas, through said fluid latex foam at substantially atmospheric presure, said gaseous mixture being at a temperature below 10° C. and above a temperature sufficiently low to freeze said fluid latex foam, and vulcanizing the coagulated latex foam.

7. A method for making latex foam rubber from an acid-coagulable latex which comprises frothing said acid-coagulable latex into a fluid latex foam, coagulating said fluid latex foam by diffusing a gaseous mixture containing from 10 to 70 percent by volume of coagulating acid gas, the balance of said gaseous mixture being non-coagulating gas, through said fluid latex foam at substantially atmospheric pressure, said gaseous mixture being at a temperature from −10° C. to −20° C., and vulcanizing the coagulated latex foam.

8. A method for making latex foam rubber from an acid-coagulable latex which comprises frothing and chilling said acid-coagulable latex to form a fluid latex foam chilled to a temperature between 0° C. to 10° C., coagulating said fluid latex foam by diffusing a gaseous mixture containing from 10 to 70 percent by volume of coagulating acid gas, the balance of said gaseous mixture being non-coagulating gas, through said fluid latex form at substantially atmospheric pressure, said gaseous mixture being at a temperature below 10° C. and above a temperature sufficiently low to freeze said fluid latex foam, and vulcanizing the coagulated latex foam.

References Cited in the file of this patent

UNITED STATES PATENTS

| | | |
|---|---|---|
| 1,993,290 | Twiss et al. | Mar. 5, 1935 |
| 2,315,366 | Daley et al. | Mar. 30, 1943 |
| 2,432,353 | Talalay | Dec. 9, 1947 |
| 2,640,036 | Brass et al. | May 26, 1953 |
| 2,801,274 | Bethe | July 30, 1957 |

UNITED STATES PATENT OFFICE
CERTIFICATE OF CORRECTION

Patent No. 2,984,631            May 16, 1961

Leon Talalay et al.

It is hereby certified that error appears in the above numbered patent requiring correction and that the said Letters Patent should read as corrected below.

Column 3, line 34, for "is" read -- in --; column 8, line 17, for "presure" read -- pressure --; line 38, for "form" read -- foam --.

Signed and sealed this 10th day of April 1962.

(SEAL)
Attest:

ERNEST W. SWIDER

Attesting Officer

DAVID L. LADD

Commissioner of Patents